United States Patent [19]

Radtchenko

[11] Patent Number: 4,956,933
[45] Date of Patent: Sep. 18, 1990

[54] ARTIFICIAL LURE

[76] Inventor: Konstantin Radtchenko, 235 Manhattan Ave., Jersey City, N.J. 07307

[21] Appl. No.: 316,808

[22] Filed: Feb. 28, 1989

[51] Int. Cl.$^5$ .............................................. A01K 85/00
[52] U.S. Cl. .................................. 43/42.5; 43/42.36; 43/42.44; 43/42.49
[58] Field of Search .................. 43/42.5, 42.08, 42.36, 43/42.44, 42.49, 42.05, 42.04

[56] References Cited

U.S. PATENT DOCUMENTS

| 1,694,697 | 12/1978 | Beidatsch | 43/37 |
| 1,994,878 | 4/1933 | Smith | 43/35 |
| 2,500,477 | 12/1948 | Walker | 43/42.44 |
| 2,543,501 | 12/1948 | Kleppen et al. | 43/35 |
| 2,597,035 | 4/1948 | Rickard | 43/42.5 |
| 2,619,756 | 4/1950 | Hunicke | 43/35 |
| 3,494,062 | 5/1968 | Gardner | 43/42.04 |
| 3,685,191 | 8/1972 | Metzger | 43/42.05 |
| 3,834,058 | 9/1974 | Gaunt | 43/42.49 |
| 4,152,860 | 5/1979 | Leonardi | 43/37 |

*Primary Examiner*—Nicholas P. Godici
*Assistant Examiner*—Michael W. Starkweather
*Attorney, Agent, or Firm*—Ilya Zborousky

[57] ABSTRACT

An artificial lure has a main body, a leader with a hook, and a preserve element located between the main body and the thin rod and formed so that it does not change during throwing the lure and manipulations in water, but then in response to a setting by a fishermen allows movement of the thin rod with the hook relative to the main body to improve engagement of the hook in the fish mouth.

6 Claims, 8 Drawing Sheets

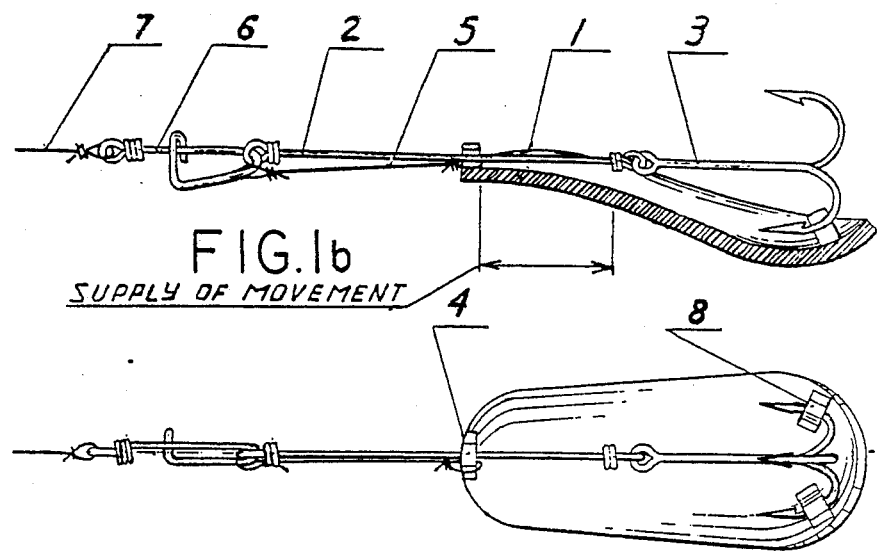
FIG. 1b
SUPPLY OF MOVEMENT
FIG. 1a
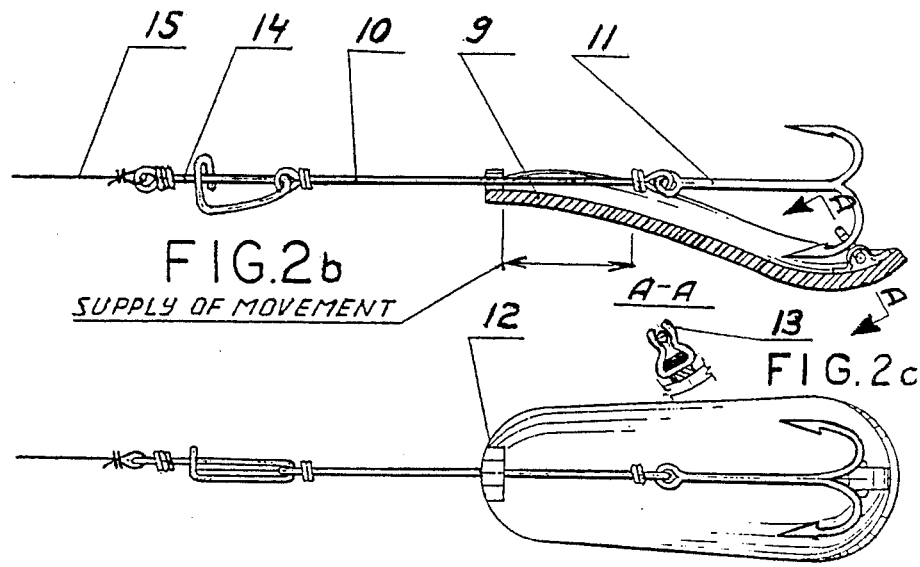
FIG. 2b
SUPPLY OF MOVEMENT
A-A
FIG. 2c
FIG. 2a

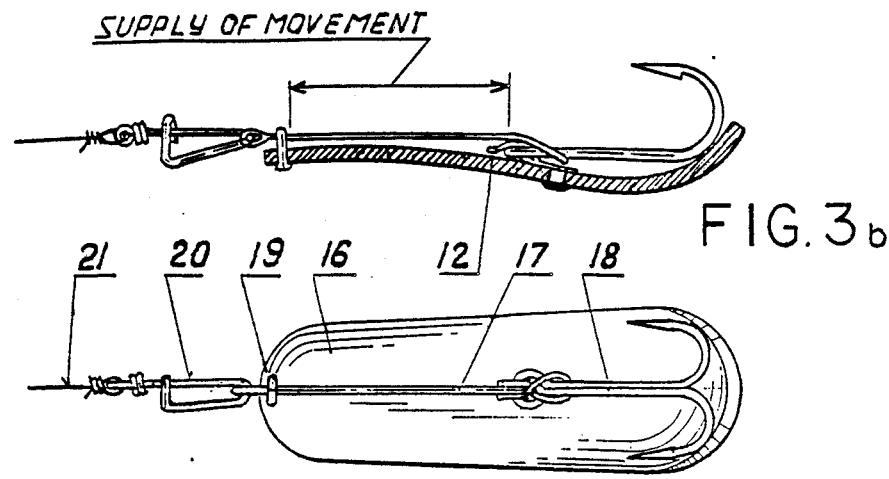
FIG. 3b
FIG. 3a
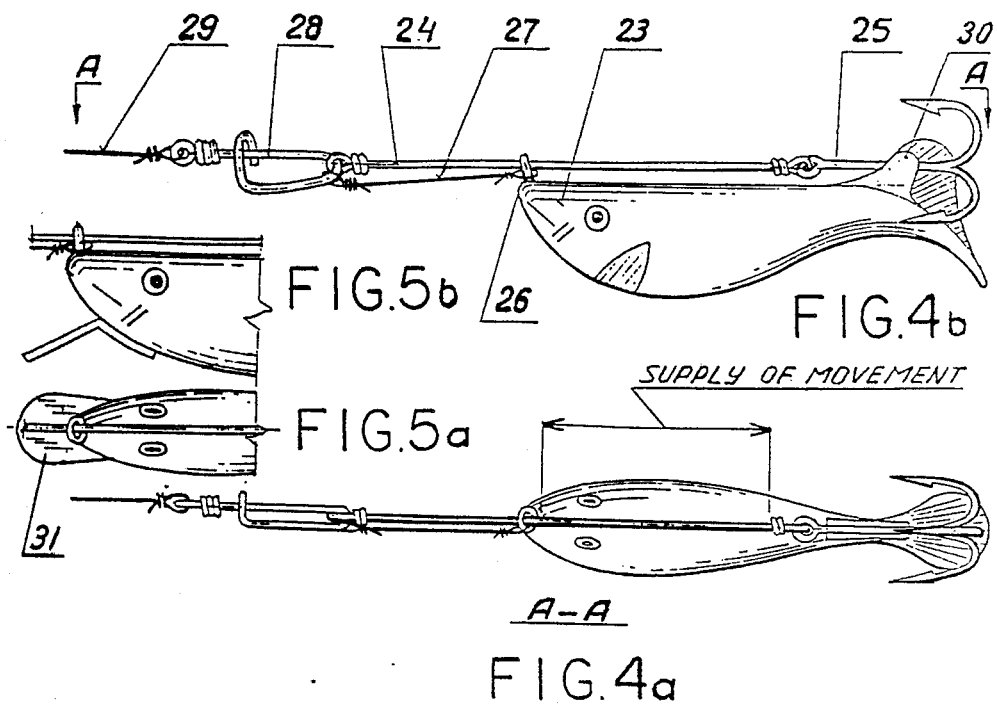
FIG. 5b
FIG. 5a
FIG. 4b
FIG. 4a

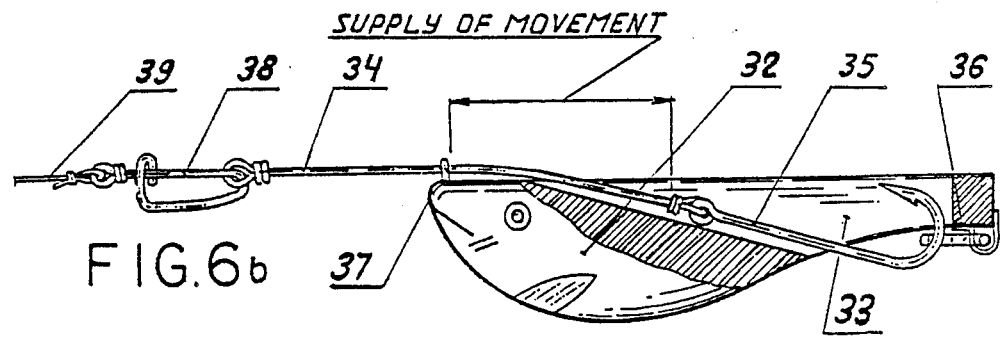
FIG. 6b
FIG. 6a
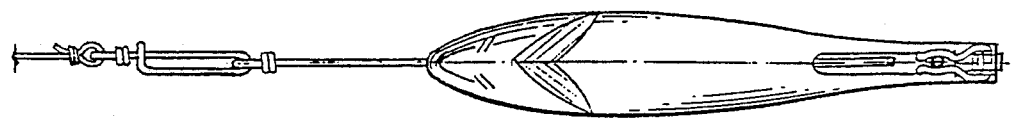
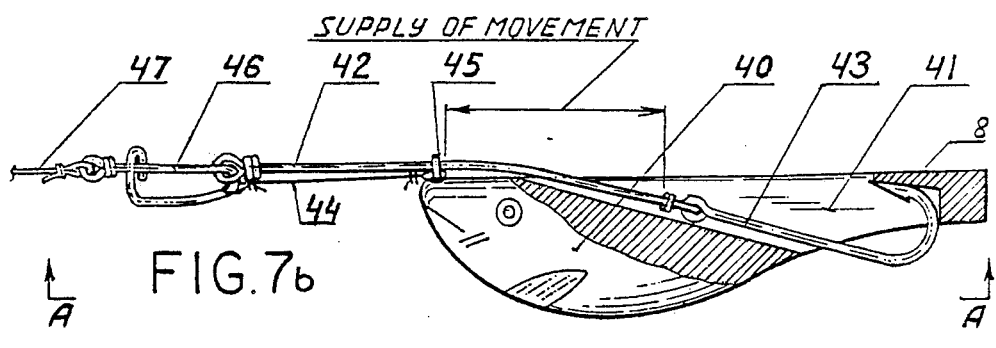
FIG. 7b
FIG. 7a
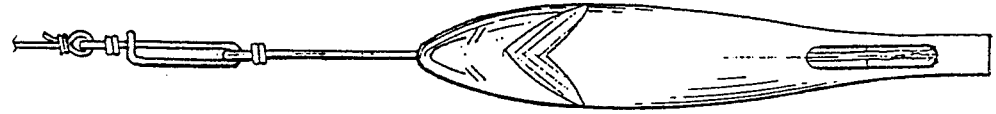

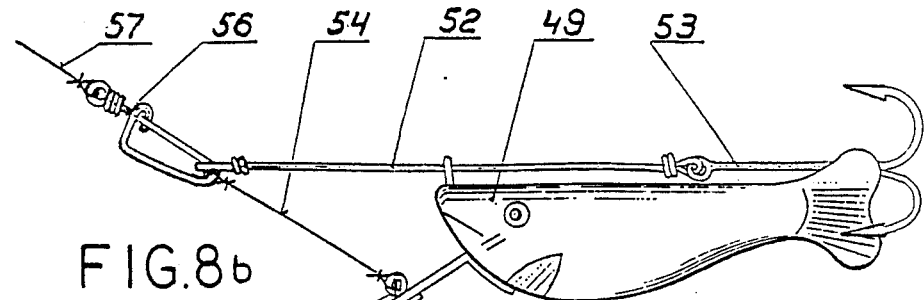
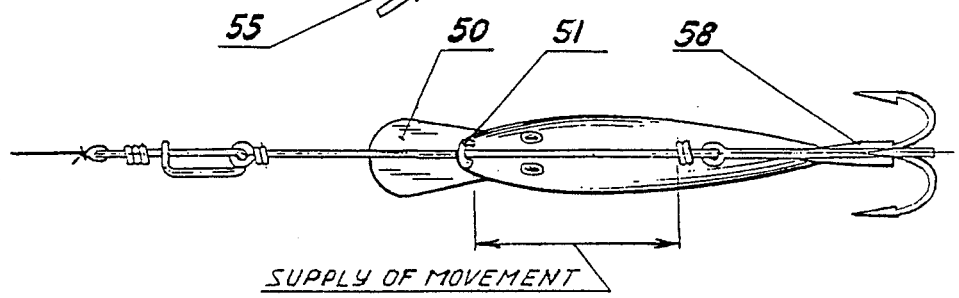
FIG.8b
FIG.8a
SUPPLY OF MOVEMENT
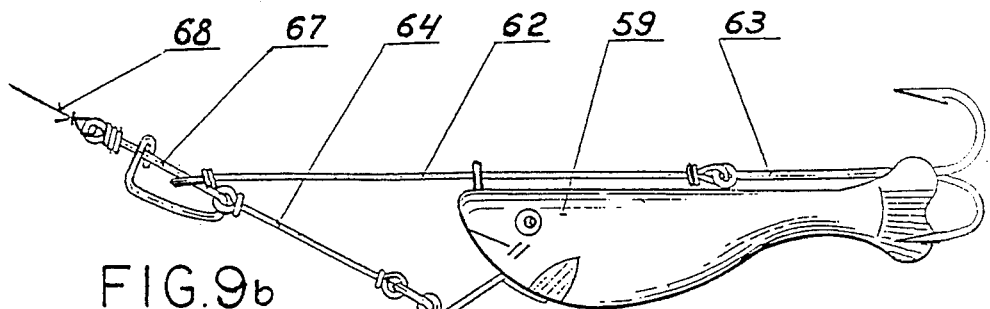
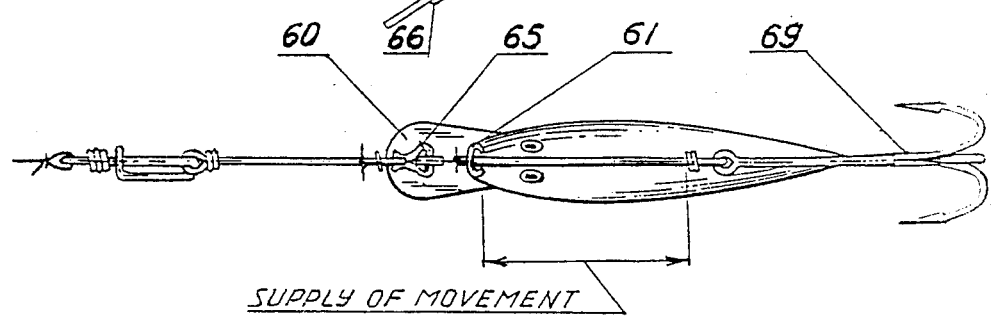
FIG.9b
FIG.9a
SUPPLY OF MOVEMENT

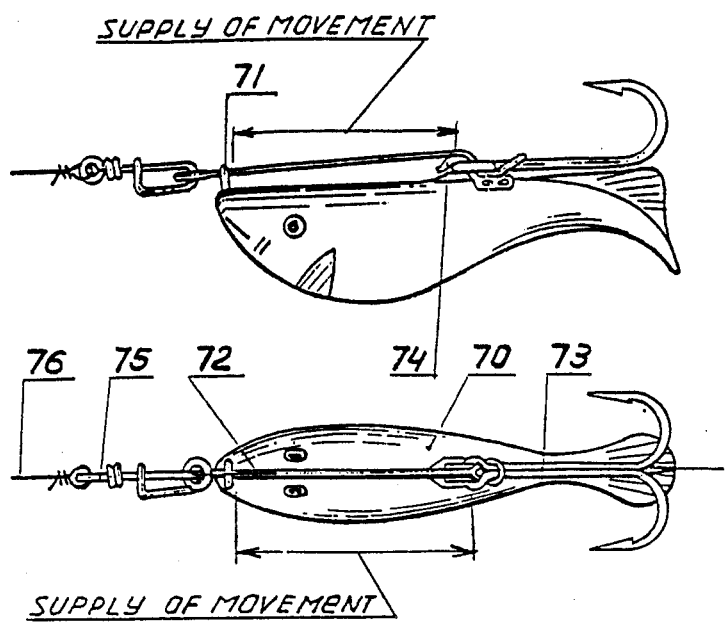
FIG. 10b
FIG. 10a
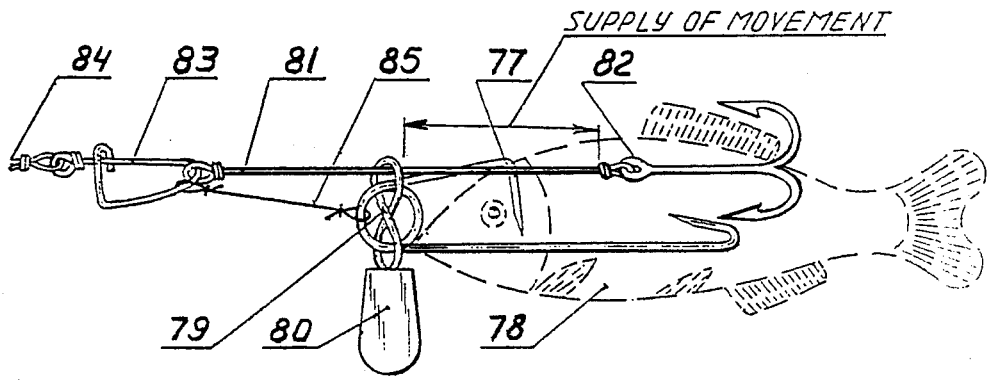
FIG. 11

A-A

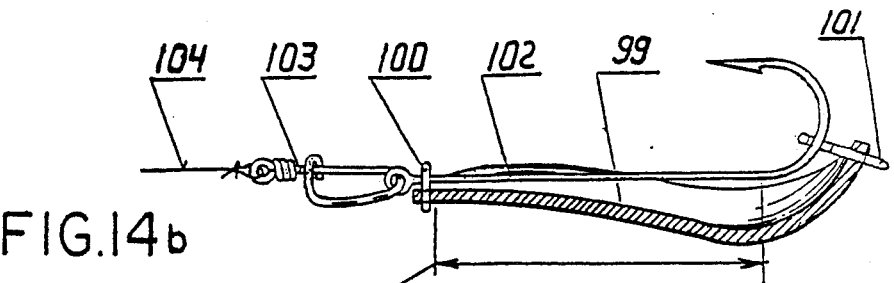
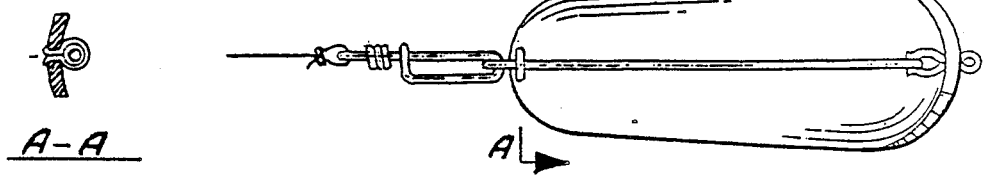
FIG.14b
SUPPLY OF MOVEMENT
A-A
FIG.14c
FIG.14a
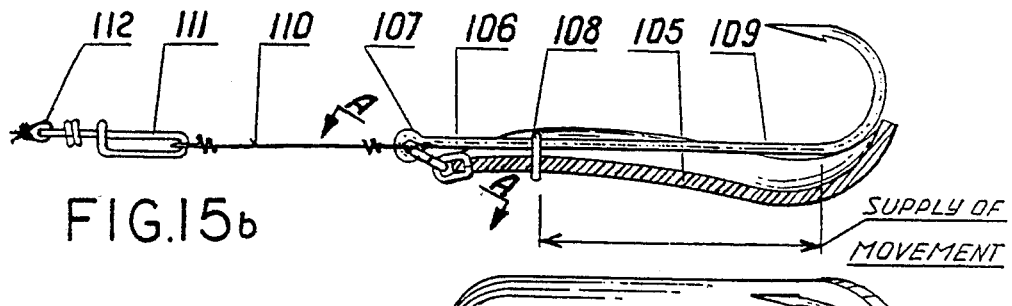
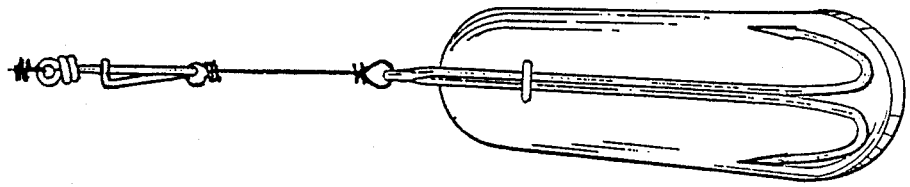
FIG.15b
SUPPLY OF MOVEMENT
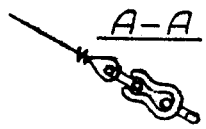
FIG.15c
FIG.15a

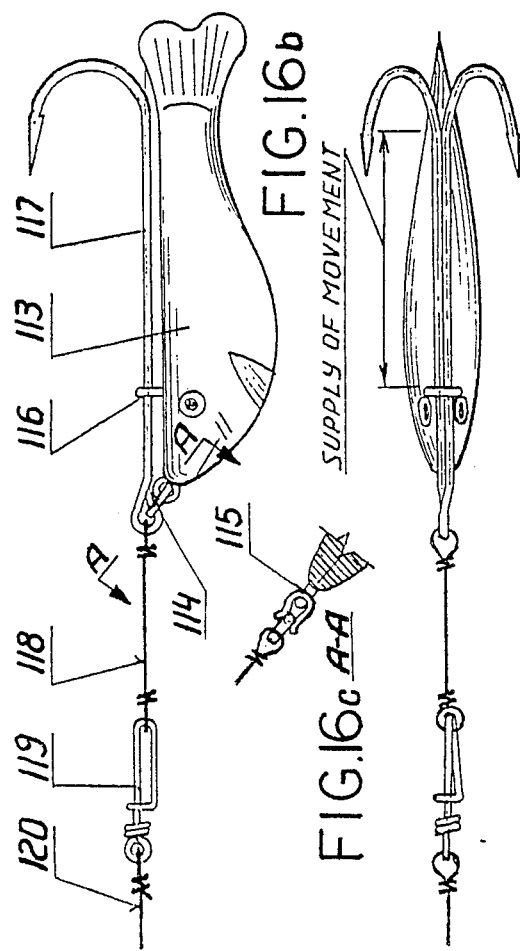

ARTIFICIAL LURE

BACKGROUND OF THE INVENTION

The present invention relates to an artificial lure, and the like.

Artificial lures, plugs and similar devices are widely used to catch fish and have great variety of constructions. In the known devices of this type the hooks are connected permanently with the lures and plugs. This to some extent limits the efficiency of fishing. It is therefore advisable to propose new artificial lures and similar devices for use for example with dead fish as a bait, which increase the fishing take.

SUMMARY OF THE INVENTION

Accordingly, it is an object of the present invention to provide a new artificial lure and the like, which allow increase of the fishing take.

In keeping with these objects and with others which will become apparent hereinafter, one feature of the present invention resides, briefly stated, in an artificial lure and the like, in which a body of the lure is subdivided into two parts, namely a main lure part and a leader part with a hook, wherein the leader part is connected permanently with a fishing line, but the main lure part is connected with the fishing line or the leader through a preserve element so that the leader has a supply of movement relative to the main lure part.

The preserve element can be disposable or designed for a multiple use, and can be formed for example as a chain.

When a fish has taken the artificial lure in accordance with the present invention, it is necessary to hit with the fishing rod with a predetermined force which destroys the preserve element if it is designed for one time use, or disconnects the same if it is designed for multiple use. After the destroying or disconnecting of the preserve element, the leader with the hook obtains a possibility to move relative to the main lure body in direction toward a fisherman, and the hook catches the fish mouth. Kinetic energy consumed for destroying or disconnecting the preserve element is transferred reliably to the leader with the hook and as a result the hook reliably threads the fish mouth.

All artificial lures are provided with hooks, and after fish has caught the hook it is necessary to set so as to pull the lure in the fish mouth and engage the mouth. The bigger is fish, the more difficult it is to pull the lure in its mouth since the force of squeezing the lure is very high. It has been proposed to increase the number of hooks, however, this reduces the biting by fish since it becomes more careful. With the new lure these disadvantages are eliminated.

The hook can be in the new lure formed as a single hook, a double hook, a triple hook and their combination. The lure main body can have an opening for passing the leader. The length of the reserve is selected so that after biting and striking, a reliable engagement by the hook of the fish mouth is insured.

The preserve element for one time use can be formed as a thin fish line, thread, plastic strip, etc. Its strength must be such that it cannot be destroyed during introduction and manipulation of the lure in water, and during throwing of the lure by a spinning. On the other hand, after the lure has been bitten, it must be destroyed under the action of strike.

The preserve element can be of multiple use and formed for example as an open U-shaped spring-biased ear, such that after the lure has been bitten it can be disconnected under the action of strike, and then the above mentioned kinetic energy will be transferred to the leader with hook and insure the reliable engagement with the fish mouth.

The novel features of the present invention are set forth in particular in the appended claims. The invention itself, however, will be best understood from the following description of preferred embodiments which is accompanied by the following drawings.

BRIEF DESCRIPTION OF THE DRAWINGS

FIGS. 1a and 1b are views showing an artificial lure and a leader with a hook connected by a disposable preserve element;

FIGS. 2a, 2b, 2c are views showing the lure and the leader with the hook connected by a preserve element for a multiple use;

FIGS. 3a and 3b are views showing a lure and a leader with a hook connected by a preserve element for one time use;

FIGS. 4a and 4b are views of a plug and leader with hook connected by a preserve element of one time use;

FIGS. 5a and 5b are views showing another plug and a leader with a hook connected with a preserve element of one time use, which connects a firehead eye of a leader or an eye of a fishline with the blade;

FIGS. 6a and 6b are views showing a plug with a leader with a hook connected with a preserve element of a multiple use, which connects the main body with the hook;

FIGS. 7a and 7b are views which show a plug with a blade and a leader with a hook connected with a disposable preserve element which connects a forehead eye of the leader and the eye of the plug;

FIGS. 8a and 8b are views showing a plug with a blade and a leader with a hook connected with a preserve element of a one time use which connects the eye of the leader and the eye of the plug;

FIGS. 9a and 9b are views showing a lure and a leader with a hook connected by a preserve element of multiple use which connects the leader with the plug;

FIGS. 10a and 10b are views showing a plug and a leader with a hook connected by a preserve element of a multiple use formed as a spring plate which fixes the eye of the hook;

FIG. 11 is a view of a device for using dead fish as a bait (or conserved fish) with a leader and a hook connected by a disposable preserve element;

FIGS. 14a, 14b, 14c are views showing another embodiment of the inventive lure which has a hook connected to the body by a multiple use preserve element;

FIGS. 15a, 15b, 15c are views showing a lure with a special double hook having an eye connected with a multiple use preserve element; and FIGS. 16a, 16b, and 16c are views showing a plug with a special double hook having an eye connected with a multiple use preserve element.

DESCRIPTION OF PREFERRED EMBODIMENTS

Figure 12B:
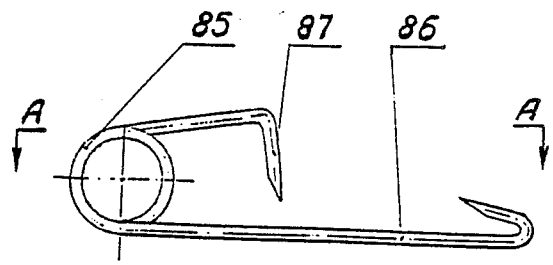
FIGS. 12a and 12b are views showing the device for using dead or conserved fish as a bait with a leader and a hook connected by a preserve element of a multiple use formed as an open U-shaped spring eye.

A lure in accordance with the present invention includes a lure main body and a thin rod with a hook which are connected with one another by a preserve element for one time use (destructible) and multiple time use (non-destructible).

FIG. 1 shows an artificial lure which has a lure main body 1, a thin rod 2 with a hook 3. The leader passes through an eye 4 provided on the main body. A preserve element 5 is connected with its one end to the eye 4 and with its another end to a front eye of the thin rod or with a buckle 6 connected with a fishline 7. The prongs of the hook can be fixed in fixing members 8. The preserve element is disposable and is destroyed during strike after the hook has been bitten. Its length is selected so that it provides a sufficient supply of movement of the thin rod 2 with the hook 3 for efficient engagement of the fish mouth by the hooks.

The strength of the preserve element is selected so that:

during throwing of the lure with a spinning and manipulations with the bait in water it is not destroyed;

after the hook has been bitten, it is destroyed during setting.

The preserve element can be formed as a fishline with a strength of 2 pounds, where the weight of the lure does not exceed 1.5 ounce. With a flexible fishing rod the setting is performed with the fishing rod inclined forwardly so that it is aligned with the fish line.

During trolling the preserve element must not be destroyed during manipulation of the lure in water, and at the same time after fish has bitten the bait the setting must destroy the preserve element.

FIG. 2 shows a lure with a lure main body 9, a thin rod 10 with a hook 11, wherein the thin rod passes through an eye 12 on the main body. An open U-shaped eye 13 forms a multiple use preserve element and is arranged in the rear part of the main body. The position of the U-shaped eye 13 and the length of the hook 11 are selected so as to provide a sufficient supply of movement of the thin rod with the hook for efficient engagement of the fish mouth. The front eye of the thin rod 10 is connected with a buckle 14 and attached to a fishline 15.

FIG. 3 shows a lure with a lure main body 16, a thin rod 17 with a hook 18, wherein the thin rod 17 passes through an eye 19 arranged in the main body. The thin rod 17 is connected with a buckle 20 attached to the fishline 21. The main body is provided with a multiple use preserve element 22 which has a special shape and fixes the eye of the hook in a predetermined position relative to the main body. The preserve element is composed of spring steel and permits movement of the thin rod with the hooks relative to the main body upon reaching of a certain force during a strike.

FIG. 4 shows a plug including a plug main body 23 resembling a natural fish, and a thin rod 24 with a hook 25. The thin rod 24 is connected with the main body through an eye 26 arranged in the body. A preserve element of one time use 27 is connected with a loop of the thin rod 24 or a buckle 28 on the one hand, and with a loop 26 in the main body on the other hand. The buckle 28 is connected with a fishline 29. The rear part of the main body has a fixing member 30 which holds a hook 25 immovably relative to the main body.

FIG. 5 shows a plug similar to the plug of FIG. 4. The difference is that the main body of the plug in FIG. 5 has a blade 31 for improved game of the plug in water.

FIG. 6 shows a plug with a plug main body 32 provided with an inner chamber 33, a thin rod 34 with a hook 35, wherein the hook is hidden in the chamber 33. A preserve element for multiple use is an open U-shaped spring eye 36. The thin rod 34 passes through the eye 37 located in the main body and is fixed to the buckle 38 connected with the fishline 39.

FIG. 7 shows a plug with a plug main body 40 having an inner chamber 41, a thin rod 42 with a hook 43. The preserve element of one time use 44 is connected with an eye 45 in the main body and with a buckle 46 attached to the fishline 47. The rear side of the chamber 41 has a step 48 which fixes the position of the hook 43 in the chamber.

FIG. 8 shows a plug with a plug main body 49 with a blade 50 and an eye 51 for passing a thin rod 52 with a hook 53. A preserve element 54 of one time use is connected with the eye 55 mounted in the blade 50, and with the buckle 56 connected with the fishline 57. The main body has a fixing member which holds one of the hook prongs.

FIG. 9 shows a plug which has a plug main body 59 with a blade 60 and an eye 61 for passing a thin rod 62 with a hook 63. A preserve element of multiple use includes an additional thin rod 64 and an open U-shaped springy loop 65 connected with an eye 66 in the blade 60. The thin rod 62 is connected with a buckle 67 attached to a fishline 68. The main body 59 has a fixing member which holds on of the hook prongs.

FIG. 10 shows a plug with a plug main body 70 having an eye 71 for passing a thin rod 72 with the hook 73. The preserve element of multiple use 74 has a special shape and fixes the eye of the hook 73 in a predetermined position relative to the main body. The thin rod 72 is connected with the buckle 75 connected to a fishline 76.

FIG. 11 shows a device for fishing of fish of prey with dead fish as a bait. It has a wire device 77 for holding dead fish 78. The latter has a floating bladder and tends to turn upside down. To avoid this, the wire device is connected by a loop in the shape of numeral 8 with a weight 80. A thin rod 81 passes through the loop and has a hook 82. The hook is engaged with one prong under the fish skin. The thin rod 81 is connected with a buckle 83 attached to a fishline 84. The preserve element of one time use 85 is connected with a spring of the wire device 77 or the loop 79 on one hand, and with the buckle 83 or the front eye of the thin rod 81.

Figure 12A:
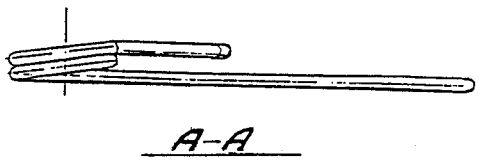

FIG. 12 shows a wire device including a spring loop 85, a long prong 86 insertable through the mouth of dead fish into its interior, and a short prong 87 insertable into bone structure of fish head.

Figure 13:
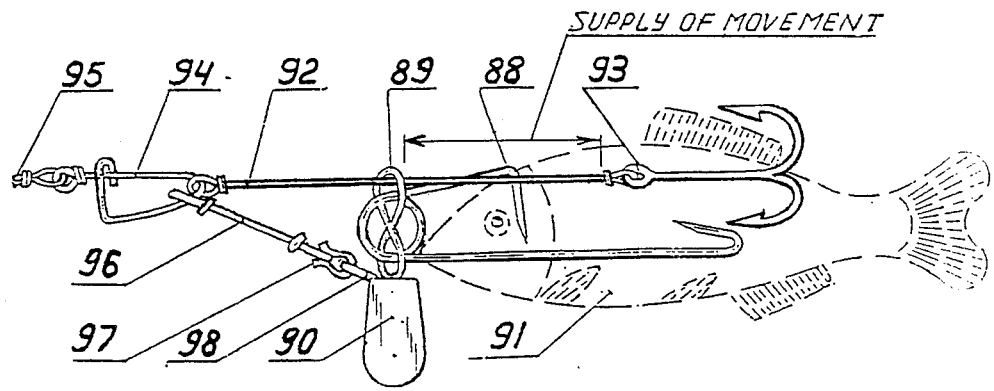
FIG. 13 is a view showing a wire device for mounting of dead fish.

FIG. 13 shows a device for fishing of fish of prey with the use of dead fish, which includes a wire device 88, a loop 89 connecting the wire device with a weight 90, dead fish 91, a thin rod 92 with a hook 93 connected with a buckle 94 which is attached to a fishline 95. The multiple use preserve element includes the thin rod 96 and an open U-shaped spring eye 97 connected to an eye 98. The latter is built in a weight 90.

FIG. 14 shows a lure including a lure main body 99 with an eye 100 and a preserve element of multiple use 101. It is formed as an open U-shaped eye inserted into an opening in the main body. A hook 102 passes through an eye 100 and is connected with a buckle 103 attached to a fishline 104.

FIG. 15 shows a lure including a main lure body 105 with an eye 106 provided with a multiple use preserve element 107, and an eye 108 with a dobble hook 109. A thin rod 110 is connected with the hook eye 109 and with the buckle 11 attached to a fishline 112.

FIG. 16 shows a plug with a main plug body 113 provided with an eye 113. The preserve element of multiple use is mounted in the eye. The plug further has an eye 116 and a double hook 117. A leader 118 is connected with the hook eye 117 and with a buckle 119 attached to a fishline 120. The construction shown in FIG. 16, as well as in FIG. 15 does not need an additional fixation of hook prongs, since the eye mounted on the main body and the preserve element sufficiently fix the hook relative to the bait.

The invention is not limited to the details shown since various modifications and structural changes are possible without departing in any way from the spirit of the present invention.

What is desired to be protected by Letters Patent is set forth in particular in the appended claims.

I claim:

1. An artificial lure, comprising
a main body;
a thin rod provided with a hook; and
means for temporarily connecting said thin rod to said main body so that during throwing of the lure and manipulations in water said thin rod remains connected with said main body in their initial position, while under the action of setting by a fisherman to set said hook said thin rod moves relative to said main body by a predetermined distance to ensure threading of said hook in a fish mouth, said means being formed so that under the action of the setting it is destroyed.

2. An artificial lure as defined in claim 1, wherein said main body has a front end provided with a blade, said means being connected between said blade and a fishline which holds the lure.

3. An artificial lure as defined in claim 1, wherein said main body has a blade, said means being provided between said blade and said thin rod with said hook.

4. An artificial lure as defined in claim 1, wherein said main body includes a wire structure for attaching dead fish as a bait, a weight for stabilizing the dead fish, and an 8-shaped loop connecting said structure with said weight and surrounding portions of said structure.

5. An artificial lure as defined in claim 8, wherein said thin rod extends through said loop and is connectable with a fishline, said means being connected with said loop and the fishline.

6. An artificial lure as defined in claim 8, wherein said leader extends through an eye provided on said weight and connected with a fishline, said means being connected with said thin rod and said eye.

* * * * *